Figure 1:
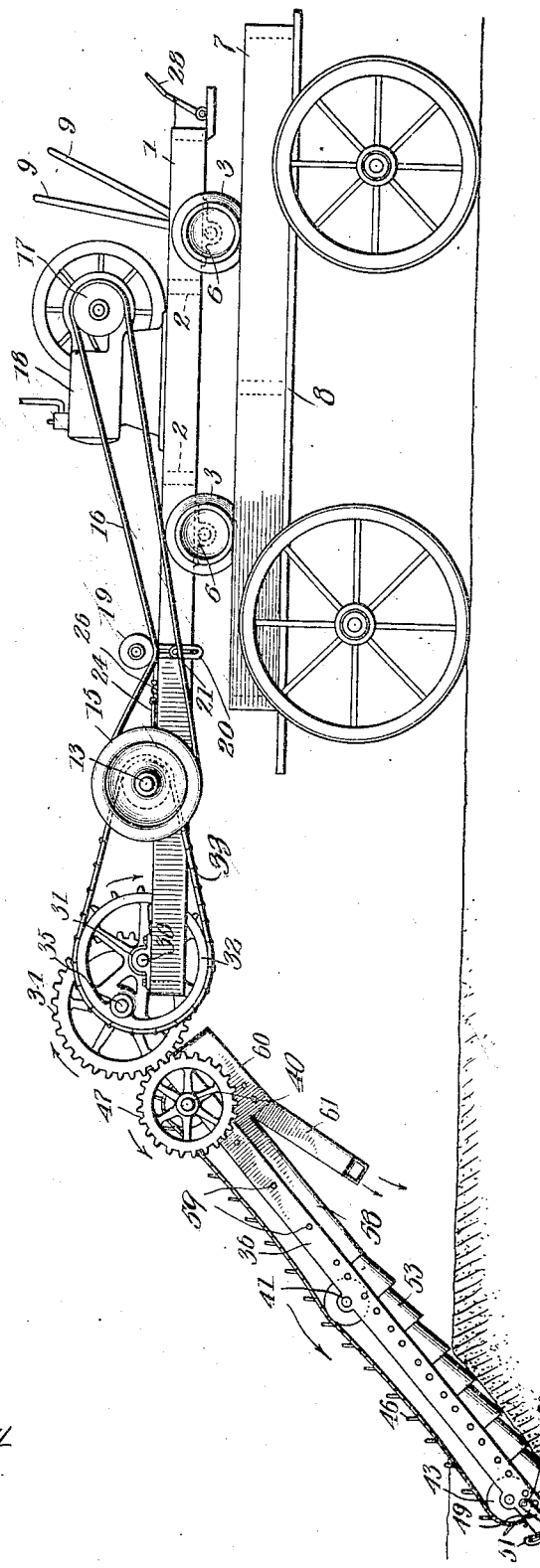

E. J. SCHRAMKE.
DITCHING MACHINE.
APPLICATION FILED JUNE 18, 1908.

917,669.

Patented Apr. 6, 1909.
2 SHEETS—SHEET 1.

WITNESSES
L. H. Schmidt
C. E. Framer

INVENTOR
Edward Schramke,
Munn & Co.
ATTORNEYS

E. J. SCHRAMKE.
DITCHING MACHINE.
APPLICATION FILED JUNE 18, 1908.
917,669.
Patented Apr. 6, 1909.
2 SHEETS—SHEET 2.
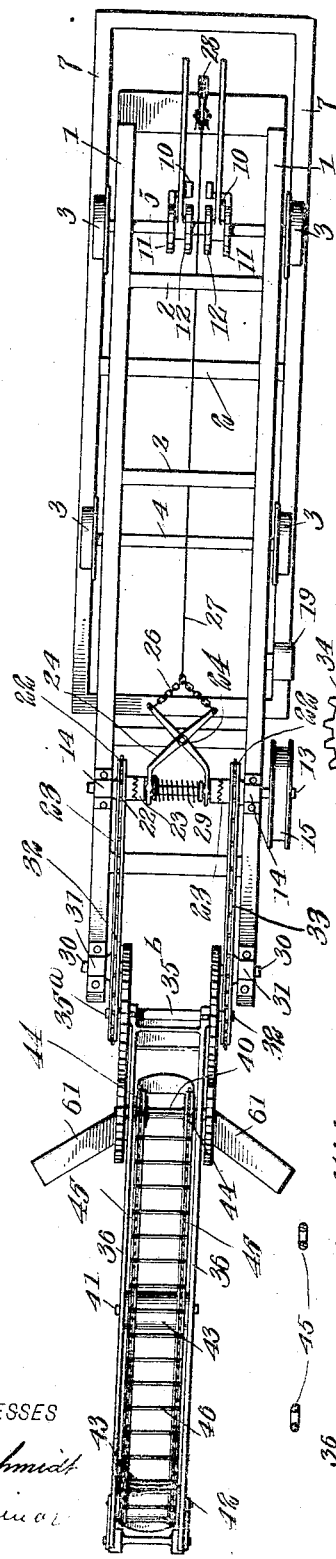
WITNESSES
L. H. Schmidt
C. E. Troman
INVENTOR
EDWARD J. SCHRAMKE
BY Munn & Co.
ATTORNEYS.

ved paper form of this document.

UNITED STATES PATENT OFFICE.

EDWARD J. SCHRAMKE, OF SAGINAW WEST SIDE, MICHIGAN.

DITCHING-MACHINE.

No. 917,669.  Specification of Letters Patent.  Patented April 6, 1909.

Application filed June 18, 1908. Serial No. 439,171.

*To all whom it may concern:*

Be it known that I, EDWARD J. SCHRAMKE, a citizen of the United States, residing at Saginaw West Side, in the county of Saginaw and State of Michigan, have invented a new and useful Improvement in Ditching-Machines, of which the following is a specification.

My invention is an improvement in ditching machines and consists in certain novel constructions and combinations of parts hereinafter described and claimed.

Referring to the drawings forming a part hereof Figure 1 is a side view of the improvement. Fig. 2 is a plan view. Fig. 3 is a longitudinal section of the digging mechanism. Fig. 4 is a transverse section through the cutters and Fig. 5 is a detail perspective view of one of the digging blades.

The present embodiment of the invention, comprises a carriage consisting of longitudinal bars 1, connected by cross bars 2, and supported by flanged wheels 3, secured to shafts 4, 5 journaled in bearings 6 on the carriage frame.

The wheels are adapted to run on a track 7, supported by a farm wagon or truck 8 of ordinary construction, and the carriage is moved on the truck by means of levers 9, journaled on the shaft 5, and provided with reversible pawls 10 engaging ratchet wheels 11—12 secured to the shaft, the ratchet wheels 11 driving the carriage in one direction, and the wheels 12 driving it in the other when said wheels are rotated.

A shaft 13 is journaled in bearings 14 near the forward end of the carriage, and the outer end of the shaft is provided with a pulley 15, connected by a belt 16, with a pulley 17, on a gasolene engine or other motor 18 mounted on the carriage, and an idler 19, journaled on a slotted arm 20 is secured to the carriage by a set screw 21, whereby to tighten the belt.

The shaft 13 has journaled thereon, near each end within the frame of the arringe, a sprocket wheel 22, and the hub of each wheel has formed thereon clutch teeth coöperating with the teeth of a sleeve 23, slidable longitudinally of the shaft but constrained to rotate therewith, and the sleeves are operated by levers 24 pivoted by their centers and having their ends forked as at 25 and engaging annular grooves on the sleeves.
The free ends of the levers are connected by a chain 26, to which is connected a cord 27, leading to a treadle 28 pivoted on the carriage adjacent to the levers 9 before mentioned, and the sleeves are normally moved toward the respective sprocket wheels by a spring 29 encircling the shaft.

It will be evident from the description that when the treadle is moved to make traction on the cord, the sleeves will be moved toward each other against the tension of the spring, thus uncoupling the sprocket wheels from the shafts.

A pair of alined stud shafts 30 are journaled in bearings 31 at the front of the carriage, and to the inner end of each of the shafts is secured a sprocket wheel 32, connected by a chain 33 with one of the wheels 22 before mentioned. A gear wheel 34 is secured eccentrically to each of the stud shafts 30, as at 35ª, inside of the sprocket wheel 32, and a shaft connects the centers of the two gear wheels. A frame comprising side bars 36, to be presently described in detail, is mounted on the shaft 35ᵇ, the end of each side bar being provided with a bearing 37, whose parts are hinged together at one side as at 38 and secured at the other by a set screw 39. The side bars of the frame are connected together, by shafts 40—41 and 42, the shafts 41 and 42 being provided with rollers 43, and the shaft 40 with spaced sprocket wheels 44, over which rollers and wheels pass sprocket chains 45, connected at suitable intervals by vanes or buckets 46. The shaft 40 is also provided with a gear wheel 47, meshing with the gear wheel 34 before mentioned, and a roller 48 is arranged at the lower end of the side bars, the roller being journaled in arms 49 pivoted to the side bars as at 50, and each arm is provided with a segmental lug 51 provided with a slot in which moves a set screw 52 on the side bar. By loosening the set screw, the arms may be moved to adjust the position of the roller.

A plurality of cutters 53 are secured to the side bars, each of the cutters consisting of a plate (Fig. 5) bent to form a bottom portion 54, convex on its outer surface, and concave on its inner, and conical in form, that is larger at one end than the other, the free edges of the plate being bent upwardly to form flanges 55, secured to the side bars by rivets 56, or any other suitable means.

The cutters are arranged in nested relation as will be evident from an inspection of Figs. 1 and 3, with their large ends toward the front, and the flanges are cut away at the rear or small end as at 57. The vanes or buckets 46 have their bottom edge arched or curved to fit the buckets as will be evident from an inspection of Fig. 4. A trough 58 is arranged behind the last bucket 53 and secured to the side bars as at 59, and the rear end of the trough opens into a receptacle 60 secured to the side bars, and chutes 61, lead from the receptacle to each side of the machine.

The machine is moved from place to place on the wagon, and when in operation the frame formed by the side bars 36 is moved longitudinally, by the rotation of the sprocket wheel 32, which is driven by the motor, through the shaft 13. At the same time the carrier comprising the chains 45 and the buckets 46 is driven, by means of the gear wheel 34 meshing with the gear wheel 47. The reciprocation of the frame forces the cutters into the earth on the downward movement, thus cutting off a portion which is moved upward by the carrier and delivered to the receptacle and from thence passes by the chutes to each side of the machine. On the upward movement of the frame, the cutters pass over the earth freely owing to their peculiar formation, and by means of the roller 48 the depth of each cut may be nicely adjusted, in accordance with the hardness of the soil. By means of the lever 9 the carriage may be moved on the tracks, as the dirt is removed, and when the full length cut is finished the entire machine may be moved by the wagon. The reciprocating frame may also be released from or connected to the motor at any time by means of the clutches.

It will be noticed from an inspection of Fig. 4, that the side bars 36, are substantially of an inverted U-shape, and the flanges of the cutters are inserted between the side walls 62—63 of the side bars.

I claim—

1. A ditching machine comprising a carriage, means for moving the carriage, a motor thereon, a shaft journaled on the carriage, a clutch for connecting the shaft and the motor, a pair of alined stud shafts journaled at the front end of the carriage and having a driving connection with the first shaft, gear wheels secured eccentrically on each shaft, a shaft connecting the centers of the gear wheels, a frame comprising parallel side bars journaled on the shaft, a shaft journaled at the upper end of the frame, gear wheels on the shaft meshing with the first named gear wheels, sprocket wheels on the shaft, rollers journaled in the frame at spaced intervals, sprocket chains passing over the sprocket wheels and the rollers, vanes connecting the chains at spaced intervals, cutters arranged transversely of the side bars at the lower end thereof, said cutters being arched downwardly and having their front ends of greater cross section, and being arranged in nested relation, the edges of the vanes being shaped to correspond with the cross section of the cutters, a trough behind the cutters, a receptacle to which the trough delivers and chutes leading from the receptacle to each side of the machine.

2. A ditching machine comprising a carriage, means for moving the same, a pair of alined stud shafts journaled at the front of the frame, wheels on the shafts, wrist pins on the wheels, a frame journaled on the wrist pins, said frame comprising parallel side bars, a shaft journaled on the upper end of the frame, sprocket wheels on the shaft, rollers journaled in the frame at spaced intervals, sprocket chains passing over the sprocket wheels and the rollers, vanes connecting the chains at spaced intervals, cutters arranged transversely of the side bars at the lower end thereof, said cutters being arched downwardly and having their front ends of greater cross section, and being arranged in nested relation, the edges of the vanes being shaped to correspond with the cross section of the cutters, a trough behind the cutters, a receptacle to which the trough delivers, chutes leading from the receptacle to each side of the machine, a motor on the carriage, a driving connection between the motor and the stud shafts and a driving connection between the stud shafts and the last named shaft.

3. A ditching machine comprising a carriage, wheels journaled at the front of the frame and provided with wrist pins, a frame comprising side bars journaled on the wrist pins, and shafts connecting the bars at spaced intervals, sprocket chains supported by the shafts, vanes connecting the chains at spaced intervals, cutters arranged transversely of the side bars at the lower end thereof, said cutters being arched downwardly and having their front ends of greater cross section, and being arranged in nested relation, the edges of the vanes being shaped to correspond with the cross section of the cutters, a trough behind the cutters, a receptacle to which the trough delivers, chutes leading from the receptacle to each side of the machine, means for driving the wheels and a driving connection between the wheels and the shafts.

4. A ditching machine comprising a carriage, wheels journaled at the front of the frame and provided with wrist pins, a frame comprising side bars journaled on the wrist pins, and shafts connecting the bars at spaced intervals, sprocket chains supported by the shafts, vanes connecting the chains at spaced intervals, cutters connecting the bars near their lower ends, said cutters being convex and conical and arranged with their large ends to the front and in nested relation, the edges of the vanes being curved to fit the inner face of the cutters, means for receiving the dirt from the vanes and delivering it to the sides of the machine, means for driving the wheels, a driving connection between the wheels and the shafts, and means for adjusting the depth of the cut of the cutters.

5. A ditching machine comprising a reciprocating frame, composed of spaced parallel side bars, shafts journaled on the side bars at spaced intervals, an endless carrier supported on the shafts, said carrier being provided at spaced intervals with transverse vanes, a plurality of downwardly arched cutting plates arranged transversely of the bars, the edges of the vanes fitting the inner faces of said plates, means for receiving the dirt from the cutters and delivering it to the sides of the machine, means for reciprocating the frame and means for operating the carrier.

6. A ditching machine comprising a recipocable frame, means for reciprocating the frame, cutters connected with the lower end of the frame, on the bottom thereof, said cutters comprising downwardly arched plates, arranged transversely of the frame in nested relation, means for adjusting the depth of the cut, a carrier for receiving the dirt from the cutter and means for driving the carrier.

7. In a ditching machine, a cutting device comprising a reciprocating frame provided on its bottom with a plurality of downwardly convexed conical cutting plates arranged in nested relation with the longer ends to the front and means supported by the frame and coöperating with the plates for removing the soil from the ditch.

8. In a ditching machine, a cutting device comprising a reciprocating frame, provided with a plurality of arched cutting plates arranged in nested relation, and means supported by the frame, and coöperating with the plates for removing the soil from the ditch.

9. In a ditching machine, a cutting device comprising a frame provided with a plurality of arched cutting plates arranged in nested relation, and means for moving the frame.

EDWARD J. SCHRAMKE.

Witnesses:
WM. J. SMITH,
J. E. ANDERSON.